United States Patent [19]

Edelman

[11] Patent Number: 5,049,627

[45] Date of Patent: Sep. 17, 1991

[54] EPOXY-AROMATIC POLYSILOXANE COMPOSITIONS

[75] Inventor: Robert Edelman, Staten Island, N.Y.

[73] Assignee: Investment Holding Corporation, Wilmington, Del.

[21] Appl. No.: 439,009

[22] Filed: Nov. 20, 1989

Related U.S. Application Data

[63] Continuation of Ser. No. 194,059, May 13, 1988, abandoned.

[51] Int. Cl.$^5$ ................. C08L 83/08; C08L 63/00
[52] U.S. Cl. ............................ 525/476; 525/484; 525/487; 525/523; 528/27
[58] Field of Search .............. 528/27; 525/476, 484, 525/487, 526, 523, 504

[56] References Cited

U.S. PATENT DOCUMENTS

| | | | |
|---|---|---|---|
| 3,247,280 | 4/1966 | Kanner | 260/824 |
| 3,516,964 | 6/1970 | Patterson | 260/46.5 |
| 3,655,420 | 4/1972 | Tichenor | 117/138.8 A |
| 4,292,110 | 9/1981 | Marteness | 156/92 |
| 4,395,527 | 7/1983 | Berger | 528/26 |
| 4,654,382 | 3/1987 | Hiza et al. | 523/457 |

FOREIGN PATENT DOCUMENTS

| | | | |
|---|---|---|---|
| 51-31799 | 3/1976 | Japan | 528/27 |
| 62-63450 | 3/1987 | Japan | 528/27 |
| 62-63452 | 3/1987 | Japan | 528/27 |

OTHER PUBLICATIONS

Advanced Composites, "Composites in Space", L. Leonard, p. 33, Nov.–Dec. 1986, L. Leonard Polymer Preprints, ACS Anaheim CA, 1986, p. 203.

J. Hedrick et al, "Synthesis . . . of Polymers" . . . Office of Naval Research Contract No. N00014-78-C, J. S. Riffle et al. 1983, pp. 1–34.

*Primary Examiner*—Melvyn I. Marquis
*Assistant Examiner*—R. Dean, Jr.
*Attorney, Agent, or Firm*—Jane E. Gennaro

[57] ABSTRACT

A composition comprising a multifunctional glycidyl ether having at least three epoxy groups per molecule with a hardening amount of a mixture of a rigid aromatic diamine and an aromatic diaminopolysiloxane can be thermally cured to a compatible composition. Glycidylamines cannot be used in this composition. Optionally, a diglycidyl ether can be included.

The cured compositions have higher glass transition temperatures than previously observed with epoxy/silicone systems. They also have improved resistance to atomic oxygen over that shown by epoxy formulations lacking a polysiloxane species therein.

14 Claims, No Drawings

EPOXY-AROMATIC POLYSILOXANE COMPOSITIONS

This application is a continuation of application Ser. No. 07/194,059, filed May 13, 1988, now abandoned.

FIELD OF THE INVENTION

This invention pertains to compatible mixtures of epoxy resins having three or more epoxy groups, a highly polar amine and an aromatic polysiloxane. More particularly it pertains to multifunctional glycidyl ethers cured with a combination of an aromatic diaminosulfone and an aromatic diaminopolysiloxane producing a material having a high glass transition temperature (Tg).

BACKGROUND OF THE INVENTION

An extensive body of prior art exists disclosing the use of a myriad of cured epoxy systems in coatings, composite matrices, casting resins, adhesives and the like (Cf. Encyclopedia of Polymer Science and Technology, Vol. 6, pages 209-271, Interscience Publishers, New York City, 1967).

Copolymers of the diglycidyl ether of bisphenol A and aminopropyl-terminated aliphatic siloxane oligomers were demonstrated by J. L. Hedrick and co-workers to have a two-phase morphology ["Synthesis and Properties of Segmented Poly(hydroxyether-siloxane Copolymers", Polymer Preprints, Vol. 27, No. 2, National ACS Meeting, Anaheim, Calif., 203 (1986)]. The maximum Tg observed in this study was 27° C. No preparation of epoxy/silicone polymer systems has been reported in the prior art where the maximum Tg is in the region of 100° C.

As the use of epoxy resins is extended, more stringent physical property requirements arise with each new application. One new demanding application for epoxy resins is as a coating or adhesive for composite materials resistant to atomic oxygen attack in an outer space environment. In addition, this application requires the material to withstand severe thermal cycling (−70° C. to +70° C.) over extended periods of time.

It has been shown that some silicone-containing materials have improved resistance to atomic oxygen (Advanced Composites, November/December, page 33, 1986).

It is therefore an object of this invention to provide an epoxy resin composition having compatible components which can be cured to hardened products without phase separation and having a Tg of at least about 100° C. or more.

It is still another object to provide siloxane-based epoxy adhesives that are more resistant to attack by atomic oxygen than conventional epoxy resins.

It is another object to provide cured epoxy resins having enhanced impact strength and moisture resistance.

Other objects will become apparent to those skilled in the art upon a further reading of the specification.

SUMMARY OF THE INVENTION

The above objects have been achieved by a composition comprising a multifunctional glycidyl ether having at least three epoxy groups, i.e.

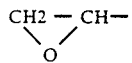

per molecule and optionally a diglycidyl ether together with a hardening amount of a mixture of an aromatic diaminopolysiloxane and a rigid aromatic diamine. The glycidyl ether must not be a glycidylamine.

The structure of the multifunctional glycidyl ethers is critical. They can be polyglycidyl ethers of polyhydric mononuclear or polynuclear phenols, epoxidized novolac resins and the like. Epoxy resins with this structure were found to be compatible with the aromatic diaminopolysiloxane-rigid aromatic diamine mixtures while multifunctional glycidyl ethers containing nitrogen, such as, N,N'-tetraglycidylmethylenedianiline (Araldite MY-720 from Ciba-Geigy Corp.) were found not to be compatible with the aromatic siloxane diamines. This was evinced by separation shortly after mixing. This result was unexpected and is unexplained. Both types of multifunctional glycidyl ethers described are highly polar materials and it was unexpected that one type would show a significantly different level of compatibility with a hydrophobic siloxane-containing amine than the other. Nitrogen-containing epoxies are commonly referred to as glycidylamines.

The aromatic diaminopolysiloxane can be represented by the generic formula:

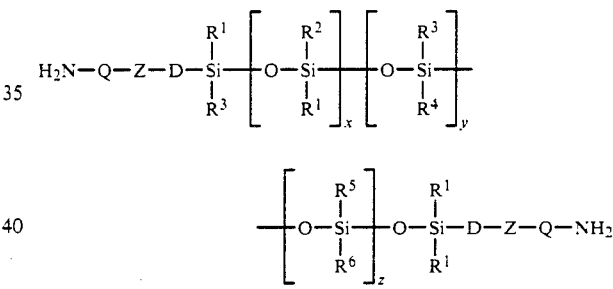

wherein
Q is a substituted or unsubstituted aromatic group;
Z is —O—, —S—, —SO$_2$—, —SO$_2$NH—, —NHSO$_2$—,

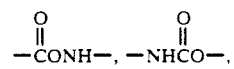

—C(O)O—, or —OC(O)—;
D is a substituted or unsubstituted hydrocarbylene;
R$^1$, R$^2$, R$^3$, R$^4$, R$^5$ and R$^6$ are each substituted or unsubstituted hydrocarbyl; and
x, y and z each have a value from 0 to 100.

The amount of diaminopolysiloxane in the mixture of diaminopolysiloxane and rigid aromatic diamine can be about 50% to 100% and the amount of rigid aromatic diamine can be from about 50% to about 0%. The mixture of diaminopolysiloxane and rigid aromatic diamine can range from about 50 to about 100 parts per hundred of glycidyl ether resin (phr).

While it is essential to employ a major amount of a multifunctional glycidyl ether having at least three epoxy groups per molecule in the compositions of this invention, one may also have present an epoxy resin having 2 epoxy groups per molecule such as, the diglycidyl ether of bisphenol A (DGEBA).

When a mixture of multifunctional glycidyl ethers are used, one can use about 20 to 50 parts of difunctional resin to about 50 to 80 parts of multifunctional resin.

The aromatic diaminopolysiloxanes can be prepared by methods known in this art. An example is British Pat. No. 1,062,418 and U.S. Pat. No. 4,395,527, incorporated herein by reference, where the reaction of the sodium salt of a phenol or naphthol with a gamma-haloalkyl silane is disclosed. Yields of at least 85% can be achieved when a compound of the formula:

F'—Q—Z—M where F'=H or halogen, M=alkali or alkaline earth metal and Q and Z are as defined above, is reacted with a bis (halohydrocarbyl) disiloxane having the formula:

X—D—R$^1$SiR$^1$—O—R$^1$SiR$^1$—D—X where X is halogen and R$^1$ and D are as defined above, at ambient temperature and pressure in the presence of a dipolar aprotic solvent, as for example, dimethyl sulfoxide, N,N-dimethylformamide, tetramethylurea, N-methyl-2-pyrrolidone or hexamethylphosphoramide.

A preferred diaminopolysiloxane is bis(m-aminophenoxybutyl)hexadecamethyloctasiloxane.

Typical of the multifunctional glycidyl ethers of this invention are the polyglycidyl ethers of novolac resins and mono and polynuclear phenols having a minimum of three or four and more epoxy groups, i.e.,

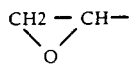

per molecule. Among the suitable di- and polynuclear phenols suitable for preparation of polyglycidyl ethers are the bisphenols described by Bender et al. in U.S. Pat. No. 2,506,486 and polyphenols such as the novolac condensation product of a phenol and a saturated or unsaturated aldehyde containing on an average of from 3 to 20 or more phenylol groups per molecule (cf. book by T. S. Carswell entitled "Phenoplasts," published in 1947 by Interscience Publishers of New York). Examples of suitable polyphenols derived from a phenol and an unsaturated aldehyde such as acrolein, are the triphenylol, pentaphenylols and heptaphenylols described in U.S. Pat. Nos. 2,801,989, and 2,885,385 both by A. G. Farnham.

Generally, these polyglycidyl ethers of polyhydric phenols are prepared by the reaction of an epihalohydrin with a polyhydric phenol under basic conditions. The polyhydric phenol can be mononuclear such as resorcinol, catechol, methyl resorcinol or hydroquinone, or may be di- or polynuclear.

The polyhydric polynuclear phenols can consist of two or more phenols connected by such groups as alkylidene, alkylene, ether, ketone or sulfone. The connecting groups are further exemplified by the following compounds: bis(p-hydroxyphenyl)ether, bis(p-hydroxyphenyl)ketone, bis(p-hydroxyphenyl)methane, bis(p-hydroxyphenyl)dimethylmethane, bis(p-hydroxyphenyl)benzophenone, 1,5-dihydroxynapthalene, bis(phydroxyphenyl) sulfone or a trisphenol or a tetraphenol.

Preferred as the epihalohydrin for reaction with the above polyhydric phenols are epichlorohydrin, glycerol dichlorohydrin, 3-chloro-1,2-epoxy butane, 3-bromo-1,2-epoxy hexane, and 3-chloro-1,2-epoxy octane.

Other polyepoxides such as bis(2,3-epoxycyclopentyl) ether, 3,4-epoxy-6-methylcyclohexylmethyl, 3,4-epoxy-6-methylcyclohexanecarboxylate, vinyl cyclohexene dioxide and dicyclopentadiene dioxide can also be used.

Novolac resins are prepared by the condensation of phenol with an aldehyde, or more generally, by the reaction of a phenolic compound, having two or three reactive aromatic ring hydrogen positions, with an aldehyde or aldehyde-liberating compound capable of undergoing phenol-aldehyde condensation.

Illustrative of phenolic compounds are cresol, xylenol, ethylphenol, butylphenol, isopropylmethoxyphenol, chlorophenol, resorcinol, hydroquinone, naphthol, 2,2-bis(p-hydroxyphenol)propane, and the like. Illustrative of aldehydes are formaldehyde, acetaldehyde, acrolein, crotonaldehyde, furfural, and the like. Illustrative of aldehyde-liberating compounds are, for example, paraformaldehyde, formalin and 1,3-5-trioxane. Ketones such as acetone are also capable of condensing with the phenolic compounds, as are methylene engendering agents such as hexamethylene-tetramine.

The condensation reaction is conducted in the presence of an acidic catalyst using less than six moles of aldehyde per seven moles of phenol. The novolac resins thus produced are permanently fusible and soluble. When the condensation reaction is completed, if desired, the water and other volatile materials can be removed by distillation and the catalyst neutralized.

In a typical synthesis, novolacs are prepared by heating one mole of phenol with 0.8 mole of an aldehyde under acidic conditions. The temperature at which the reaction is conducted is generally from about 25° C. to about 175° C.

The epoxidized novolac resins used in this invention can be prepared by the epoxidation of the novolac by methods well known in the art, as for example, by reaction with an epihalohydrin as described in Epoxy Resins by H. Lee and K. Neville, McGraw Hill Book Co., page 195, New York City.

The term "rigid aromatic amine" is used herein to mean preferably those amines that have the following structure:

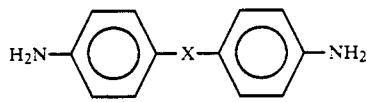

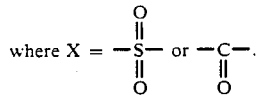

The aromatic amines having the structure shown above impart "latency" to the formulations containing them thus providing a longer pot life.

Other types of rigid aromatic amines not having the structure above, such as, m and p-phenylenediamine, 4,4'-methylenedianiline, 1,3-diaminocyclohexane, 1,4-diaminocyclohexane, menthanediamine, 2,7-diaminonaphthalene, 3,7-diaminonaphthalene, benzidine, 3,3'-dimethylbenzidine, 3,3'-dimethoxybenzidine, m-xylenediamine, p-xylenediamine and the like can be used but they are not as favored because of the short pot life of the compositions obtained when they are mixed with epoxy resins.

The term "compatible composition" is used herein to mean compositions whose components are dispersed with one another and do not separate during the life of the product. These compositions exist as a plurality of phases and exhibit more than one glass transition temperature.

The preferred rigid aromatic amine is 3,3'-diaminodiphenylsulfone although others, such as, 4,4'-diaminodiphenylsulfone, 4,4'-diaminodiphenylketone, 3,3'-diaminodiphenylketone and the like can also be used.

To demonstrate the invention, a series of experiments was conducted in which TACTIX 742, a glycidyl ether of triphenylolmethane was used at varying levels by weight with ARALDITE 6010, a diglycidyl ether of bisphenol A.

The invention is further described in the examples which follow. All parts and percentages are by weight unless otherwise specified.

EXAMPLE 1

As a general procedure, the epoxy resins were combined first followed by the addition of rigid aromatic diamine and finally by the addition of aromatic diaminopolysiloxane. The combined materials (not yet mixed) were placed in a circulating air oven at 110°–150° C. for 5–15 minutes. They were then removed and mixed while hot. Additional brief heating (i.e. up to about 5 minutes) can be used to remove entrapped air. If any undissolved particulates remain in the mixture, they are removed by passing through a coarse filter. The mixture can be cured immediately or stored and cured at a later date. The pot life of these compositions varied from 4 to 6 days depending on the particular ratio of components in the formulation. Pot life was determined by allowing a 20 gram mass to stand in a beaker at room temperature until tack was completely gone. The pot life can be extended by freezing the composition.

In a specific example the following ingredients were added to a beaker:
12 g of TACTIX 742 epoxy resin (a trademark of Dow Chemical Co. for a triglycidyl ether of triphenylolmethane)
12 g of ARALDITE 6010 epoxy resin (a trademark of Ciba-Geigy Chemical Co. for a bisphenol A diglycidyl ether);
1.5 g of 4,4'-diaminodiphenylsulfone; and
16.0 g of bis(m-aminophenoxybutyl)hexamethyloctasiloxane.

The beaker was placed in a circulating air oven at a temperature of 150° C. for about 5–10 minutes. The ingredients were mixed thoroughly and filtered. A clear homogeneous system was obtained that remained that way on standing (one of the indicia of compatibility) was cured at 150° C. for one hour and at 170° C. for two hours. A light brown clear plaque was formed. The Tg of this product was 100° C. when measured by the Differential Scanning Calorimeter method (DSC). A dynamic thermogravimetric analysis (TGA) was run in air. The initial weight loss was observed at 275° C. A 10% weight loss was observed at 370° C.

The pot life of 25 g of the uncured mixture of ingredients delineated above was determined by allowing it to stand at room temperature. After 4 days, gelation was observed.

EXAMPLE 2

Using the procedure of Example 1, the following ingredients were added to a beaker:
12 g of TACTIX 742;
8 g of ARALDITE 6010;
4 g of 4,4'-diaminodiphenylsulfone; and
6.4 g of bis(m-amminophenoxybutyl)hexamethyloctasiloxane.

The ingredients were heated in a circulating air oven at 150° C. for 10–15 minutes. The cloudy mixture was filtered and cured as in Example 1. A light brown clear plaque was formed. The Tg (DSC) of this product was 120° C. Pot life was determined as in Example 1. Gelation was observed after 6 days.

EXAMPLE 3

Example 1 was repeated using:
60 parts of TACTIX 742,
40 parts of ARALDITE 6010,
8.4 parts of 4,4'-diaminodiphenylsulfone; and
91.6 parts of bis(m-aminophenoxybutyl)hexamethyloctasiloxane.

The cured product showed a Tg of 100° C. and a pot life of 4 days.

EXAMPLE 4

Example 1 was repeated using:
60 parts of TACTIX 742,
40 parts of ARALDITE 6010,
21.4 parts of 4,4'-diaminodiphenylsulfone; and
78.6 parts of bis(m-aminophenoxybutyl)hexamethyloctasiloxane.

The cured product showed a Tg of 107° C. and a pot life of 5–6 days.

EXAMPLE 5

Example 1 was repeated using:
60 parts of TACTIX 742,
40 parts of ARALDITE 6010
38.8 parts of 4,4'-diaminodiphenylsulfone; and
61.2 parts of bis(m-aminophenoxybutyl)hexamethyloctasiloxane.

The cured product showed a Tg of 120° C. and a pot life of 5–6 days.

EXAMPLE 6

Example 1 was repeated using:
70 parts of TACTIX 742,
30 parts of ARALDITE 6010
7.3 parts of 4,4'-diaminodiphenylsulfone; and
92.7 parts of bis(m-aminophenoxybutyl)hexamethyloctasiloxane.

The cured product showed a Tg of 101° C. and a pot life of 4 days.

EXAMPLE 7

When Example 1 is repeated with the exception that no diglycidyl ether is included in the composition, a cured product with a comparable Tg and pot life is obtained.

The compositions described in the preceding examples are useful as coatings, adhesives and potting compounds.

CONTROL

ARALDITE MY-720 epoxy resin (26.4 g) was added to a beaker and heated to about 100° C. ARALDITE MY-720 is a Ciba Chemical Co. trademark for N,N'-tetraglycidylmethylenedianiline. The curing agent, 4,4'-diaminodiphenylsulfone (3.7 g) was melted in a beaker on a hot plate. This material was added in liquid form to the heated epoxy resin. Nineteen grams of bis(m-aminophenoxybutyl)hexamethyloctasiloxane were then added to the mixture. The mixture was thoroughly mixed to an opaque paste. Extended at 150° C. resulted in separation of the bis(m-aminophenoxybutyl)hexamethyloctasiloxane to form a clearly defined layer on the top of the mixture.

The control is clear evidence of the incompatibility of tetraglycidylamine resin with a mixture of rigid aromatic diamine and aromatic diaminopolysiloxane.

If it is desired, one may add to the claimed mixture one or more fillers, pigments, accelerators, thixotropic agents and the like. Exemplary fillers include mica, inorganic carbonates or sulfates, clays, diatomaceous earth and the like. Representative pigments include titanium dioxide, cadmium reds, chrome oranges, chrome yellows, phthalocyanine blues and greens and the like. A preferred blue pigment is BASF Heliogen blue K6911D. Trifunctional amines, such as, tribenzylamine are preferred accelerators. Aerosil and silica are preferred thixotropic agents.

Although the invention has been described with a certain degree of particularity, it is understood that the present disclosure has been made by way of example and that numerous changes can be made without departing from the spirit and scope of the invention.

I claim:
1. A curable and compatible composition comprising:
   (a) a multifunctional glycidyl ether, having at least three epoxy groups per molecule, and being free of glycidylamines, present in an amount from about 50% to about 67% by weight of the curable and compatible composition; and
   (b) a hardening amount of a mixture of an aromatic diaminopolysiloxane and a rigid aromatic diamine, the diaminopolysiloxane present in an amount from about 50% to 100% by weight of the mixture and the rigid aromatic diamine present in an amount of about 0% to 50% by weight of the mixture, wherein the aromatic diaminopolysiloxane has the formula:

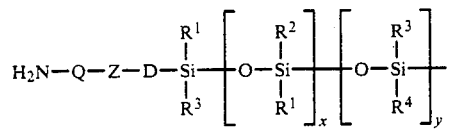

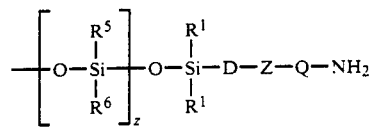

wherein:
Q is a substituted or unsubstituted aromatic group;
Z is selected from the functional groups consisting of —O—, —S—, —SO₂—, —SO₂NH—, —NHSO₂—, —C(O)ONH—, —NHC(O)O—, —C(O)O, or —OC(O)—;
D is a substituted or unsubstituted hydrocarbylene;
$R^1$, $R^2$, $R^3$, $R^4$, $R^5$, and $R^6$ are independently selected from the group consisting of substituted or unsubstituted hydrocarbyl; and
x, y, and z each have a value from about 0-100, except that x+y+z must equal at least about 6;
and wherein the mixture of aromatic diaminopolysiloxane and aromatic diamine is present in an amount from about 33% to about 50% by weight of the curable and compatible composition; and
wherein the composition is characterized by the absence of phase separation and, when cured, has a glass transition temperature ($T_g$) of at least about 100° C.

2. Composition claimed in claim 1 wherein the rigid aromatic diamine is a diaminoarylsulfone.
3. Composition claimed in claim 2 wherein the diaminoarylsulfone is 4,4'-diaminodiphenylsulfone.
4. Composition claimed in claim 2 wherein the diaminoarylsulfone is 3,3'-diaminodiphenylsulfone.
5. Composition claimed in claim 1 wherein the rigid aromatic diamine is a diaminoarylketone.
6. Composition claimed in claim 5 wherein the diaminoarylketone is 4,4'-diaminodiphenylketone.
7. Composition claimed in claim 1 wherein a diglycidyl ether is also present.
8. The composition claimed in claim 1 wherein Q is phenylene.
9. The composition claimed in claim 1 wherein Z is —O—.
10. The composition claimed in claim 1 wherein D is a carbylene having 4 carbon atoms.
11. The composition claimed in claim 1 wherein the multifunctional glycidyl ether is an epoxidized novolac.
12. The composition claimed in claim 1 wherein the multifunctional glycidyl ether is the triglycidyl ether of triphenylolmethane.
13. The composition claimed in claim 7 wherein the diglycidyl ether is a diglycidyl ether of bisphenol A.
14. The composition claimed in claim 7 wherein the ratio of multifunctional glycidyl ether to diglycidyl ether is about 50 to 80 parts of the former to about 20 to 50 parts of the latter.

* * * * *